2,737,541
STORAGE BATTERY ELECTRODES AND METHOD OF MAKING THE SAME

Roger S. Coolidge, Bedford Village, N. Y.

No Drawing. Application February 17, 1951,
Serial No. 211,574

20 Claims. (Cl. 136—20)

This invention relates to an improved electrode for storage batteries. The invention also pertains to an improved electrode construction for those batteries, which electrode combines low cost construction and light weight with high capacity and high discharge rates together with the most satisfactory, non-corrosive, non-softening porous plate structure yet achieved. Thus, the improved electrode lends itself to mass production and use of batteries in much smaller sizes and of lighter weight and lower cost than have heretofore been commercially possible.

The invention also relates to the production of a greatly improved battery electrode of the porous type wherein both the electrical storage capacity and the ability of the electrode to be repetitiously charged and discharged greatly surpasses the results of any commercially available porous battery electrode of substantially equivalent size and weight.

Also, this invention more particularly relates to the manufacture, structure and operation of batteries of the nickel-cadmium or nickel-iron alkaline type, which types have great ability to give satisfactory service after many years of use or non-use.

One of the features of producing the improved electrode is to provide a porous carrier structure that will receive and hold active battery material in a manner that enables it to be charged and discharged at high rates. The carriers are preferably of three kinds; non-conductive as exemplified by the use of non-conducting plastics, glass bead matrices, ceramics and other general non-conducting porous materials. Semi-conductive carriers as exemplified by conductive plastics, carbon and graphite, and the metallic conductor carriers are exemplified by nickel, coated iron, and coated copper, and the like.

The preferred active material which may be embedded or positioned or placed in the porous carrier may be divided into two categories as follows: For the positive electrode—oxides or hydroxides of nickel, cobalt, or lead; and for the negative electrodes—cadmium or iron, or their oxides and hydroxides, or oxidized lead.

One of the important features of this invention is the provision of a non-conductor carrier that is of light weight, low-cost, and non-corrosive, non-softening structural material that will efficiently accept and hold a battery active material. In using the non-conductor carrier of porous structure, it has been found desirable to coat the same with a thin coating of electrical conducting material, such as silver, or nickel on silver, and then to place the active material within this porous carrier in a manner to give high capacity and high discharge rates when used in an electric storage battery. In placing or embedding this active material in the carrier, the improved processes, herein later disclosed, result in exceptional low installation cost.

Another feature of this invention is the provision of several processes for placing or embedding the active battery material in the several different kinds of carriers mentioned above. Some of the processes include the definite application of the silver, or nickel-on-silver, plating to the particularly selected type of carrier prior to adding the active material. Some of these processes include steps of either electro-plating or mechanically emplacing the active material in the carrier structure.

Another feature of this invention relates to the processes of plating the carrier with a thin coating of silver, or silver and nickel, or in embedding or placing the active material, and which processes are carried on continuously until the desired thickness or embedment is obtained.

A further feature of the invention, when plating upon silver, or electrolytically plating nickel, is that of an electrolytic process which may be carried on continuously until the nickel plating is substantially accomplished, and then by adding one or more chemicals, such as one or more oxidants, the deposition is made to occur of active electrode material in the form of nickel oxide or nickel hydroxide which is plated, as part of the same continuous process, onto the surfaces of the internal pores of the carrier. Thus, there is a continuous electrolytic plating in the internal pores of the structure of active material, which usually leaves the previously plated nickel on the outside of the carrier unaffected or uncorroded.

One of the processes of this invention is the continuous and uninterrupted electroplating emplacement of the active material upon the surface of the internal pores of the interior of the electrode carrier. This emplacement may be controlled so as to obtain different thicknesses in different parts of the carrier structure with reference to the depth of the pores from the outer surfaces of the carrier structure. This deposition is usually not terminated until the desired thickness of plated active material is thus obtained. Desired thickness is usually determined by testing a series of sample electrodes, each electroplated by this process, for different ampere-hours of plating time at different rates of current flow. In many instances the testing of these electrodes consists of making the electrodes into functioning electric storage cells in order to determine which sample has the most electrical capacity. Thereafter processing may be terminated by adhering to the same time, same current flow, and other minor conditions used to process the optimum sample.

In respect to plating the silver on to non-conductive or semi-conductive carrier structures, there are many advantages of its use for the following reasons: (1) to make the surface of the non-conductor carrier conductive; (2) to give added structural strength to the carrier; (3) to serve as a base upon which other metals may be placed by electro-plating or otherwise; (4) to give a lower internal resistance to the electrode.

In respect to nickel plating the following advantages are noted: (1) to enhance the conductivity of the electrode, thereby giving lower internal resistance; (2) to coat a metallic porous carrier when made of other metals, such as of copper or of iron, so as to later prevent electrolytic side reactions; (3) to increase the structural strength of the carrier, especially when the carrier is of very porous graphite or of a relatively weak porous plastic, or of a prepared glass bead matrix; (4) to be transformed by an oxidant either chemically or electrolytically into an active battery material of nickel oxide or nickel hydroxide; and (5) to more effectively and at a low cost produce a required weight of nickel plating by sifting into the pores a proportionate amount of nickel powder, and then nickel plating the remaining desired weight of nickel over the powder to give the total weight of nickel required. For instance, if the total amount of nickel desired for addition to the carrier is 4 grams, then 3 grams of nickel powder may be sifted into position mechanically or otherwise, and 1 gram of nickel used to plate over the 3 grams thereby saving 3 ampere-hours of plating time to achieve the desired plated effect.

This silver or silver-nickel plating of a non-conductive or semi-conductive carrier makes possible the use of a new class of light weight carrier structures, such as plastics, for properly receiving and retaining electrode active material.

It, therefore, will now be noted that it is possible to produce several different light weight, low cost electrodes particularly adapted to produce both small and large size, light weight, rechargeable batteries of high capacity and high discharge rates. These advantages are obtained because of the preferred carrier being of a cost that is on a cents-per-pound basis rather than dollars-per-pound basis, and because the treatment of this carrier to produce the final electrode is carried on continuously, thereby eliminating a series of expensive handling costs when done by a step by step method. Such light weight and high capacity electrodes are particularly adapted for use in batteries in submarines, as well as in miniature type batteries particularly adopted for portable communication apparatus and flash lights usually employing expendable dry cells, or in other uses when these features and characteristics are important required factors.

One of the preferred electrodes giving these advantages for a positive electrode is that of selecting a porous graphite carrier and plating the same with nickel by a continuous electrolytic process, which process subsequently including adding nickel oxide or nickel hydroxide as an effective nickel active material suitably emplaced upon the surfaces of the pores within the electrode to yield the optimum performance of the battery.

For the preferred negative electrode, a like porous graphite carrier is selected and cadmium powder sifted into it, retention therein being automatically achieved after the first few charging and discharging cycles in an electric cell during which the cadmium turns into a more sponge-like form.

At this point it is desired to comment on several of the carriers and their structures as follows:

The plastic, non-conducting carrier may be of any suitable plastic material which is porous and can be plated with silver or silver followed by nickel to form a suitable surface for receiving and retaining the active material, for example, by being subjected to electroplating of nickel oxide or nickel hydroxide. The glass bead matrix is quickly and suitably produced by following the steps outlined in the following example, noted as Example #1.

*Example #1*

37½ grams of glass beads, approximately 0.005 inch in diameter, were mixed with 10.2 grams of stannous chloride, 9 grams of ferrous chloride, 6.2 cc. of ammonium hydroxide, 8 cc. of water, and 24 grams of finely divided ammonium chloride, and stirred while heating sufficiently to drive off all moisture.

One-sixth of the coated beads were then placed in a mold approximately 45 mm. in diameter, and the top made smooth so the depth of beads in the mold was constant. An Alundum or other suitable heat resistant porous disc was placed over the top. The mold was then surrounded by graphite in a dish, and was placed in a furnace. The temperature was raised as follows: Room to 250° C. in 13 minutes; 250° C. to 430° C. in 13 minutes; 430° C. to 700° C. in 17 minutes; above 700° C. and under 735° C. for 15 minutes; after which the mold was removed and allowed to cool. However, it was found that somewhat similar results could be obtained in 17½, 18½, 20½ and 11½ minutes, respectively, for the above temperature steps. The resultant product was a sintered porous rigid glass structure of bonded or firmly joined glass particles having an average diameter of 44.6 mm. and an average thickness of 7.6 mm., having a flat top and bottom, and a calculated volume of 11.9 cc. The product was then washed thoroughly in one or more acids to remove any undesired byproducts. It was then found this glass bead carrier approximated 6 grams in weight which was substantially the original weight of the beads. This formed carrier gave a calculated porosity of 80% for the whole structure.

One of the functions of the dish and disc together with the surrounding graphite was to facilitate thorough heating without raising the temperature of the outside of the mixture excessively over the temperature at the center of the mixture, thus obtaining a substantially uniform heating throughout the mixture, and which effective heating was advantageous in eliminating warpage or irregularities in the finished sintered carrier structure. Also, the disc delocalizes the escape of any gasifying agents, thereby allowing the proper and substantially even formation of pores in the carrier.

Other non-conductors may be of any suitable ceramics as long as they are generally of non-sealed, porous structure.

In respect to the semi-conductive carriers, suitable carbon or graphite products generally purchased on the open market are satisfactory as long as they have a suitable, non-sealed, porous structure that meets the requirements of a treated electrode. Some of these carbon and graphite carriers may be specified as to percent effective porosity and pore diameter.

Another of the semi-conductive type of carriers is the conductive plastic carrier which preferably is formed like ordinary porous plastic, but has electrical conductivity inherent in it to some extent, and as opposed to having a conductive coating. A suitable type of a conductive plastic may be obtained from the Markite Company of New York, New York.

As to the conductive or metal type of carrier such as nickel, iron, copper, tin, or the like, or their combinations, it is desirable, with the exception of the nickel structure, to coat the iron, or copper, or tin, or other metals, or combinations thereof, with silver alone or nickel on silver, or nickel alone, in order to prevent deleterious action during the normal operation of the battery.

Referring now to a nickel carrier structure, it is preferably formed by sintering nickel powder to give a porous nickel body or carrier. This carrier is then available for supporting the active electrode material. The preferred manner of producing such a nickel carrier is set forth in the following examples, noted as Examples #2 and #3.

*Example #2*

In accordance with a specific example of a process for making a porous nickel electrode structure, 18 grams of nickel powder made, for instance, from nickel carbonyl, and 1½ grams each of ammonium bicarbonate, ammonium oxalate, ammonium chloride and ammonium sulphate, were thoroughly ground and mixed and poured into a heat resistant ceramic mold four centimeters in diameter. The manner of placing the powder in the mold was such that the top surface of the powder was even and parallel to the bottom surface. No pressure was applied, which is usual in most metal sintering processes. The mold was then placed in a larger heat resistant receptacle and packed in graphite to serve as a means of protecting the contents of the mold from being oxidized. The receptacle was then heated in a furnace at a temperature of 900°–1000° C. for at least 40 minutes. The resultant product was a sintered nickel structure with a porosity of 67% of the overall volume.

*Example #3*

In another specific example for producing the nickel carrier, the same apparatus and procedure was used with a mixture of 16½ grams of nickel powder, 2 grams each of ammonium bicarbonate and ammonium chloride and 1¾ grams of cadmium carbonate. The resultant product was a sintered nickel structure with a porosity of 80% of the overall volume.

It has been found that the procedures described, the agents added to the nickel powder will generate pore producing gas throughout most of the temperature range of the sintering process while the metal is coalescing.

When the carrier is of a porous iron or porous copper or tin construction, it is desired preferably to coat each of these structures with nickel rather than silver, or nickel on silver, to form a nickel plating over all surfaces including the surfaces of the external and internal pores. To this nickel coated carrier is subsequently added, by embedding or otherwise, the active material of the electrode.

In producing the conducting carriers of iron, copper, tin, and the like, or their combinations of their combinations with nickel, they may be formed in substantially the same manner as the nickel carrier set forth in Examples #2 and #3. The porous structures thus obtained are then coated, preferably with nickel.

The processes of silver and nickel plating will now be considered.

In respect to the silver plating, there are several features and steps which are not found in the published or patented art.

The internal surface of the carrier structure to be plated is so extensive and the volume of the carrier is so small that the usual silver plating methods are not always advantageous, either by reason of the relatively large amount of water involved in such methods, or by reason of the difficulties in eliminating the by-products of the plating operation from the recesses and confines of the internal pores or voids. For that reason, a new and improved silver plating process is employed which does not have the disadvantages of the usual silver plating method.

*Example #4*

In accordance with this specific example of a method of silver plating, a porous electrode carrier structure, which is non-conductive or not sufficiently conductive, consists of a porous flat carrier made of glass beads as described in Example 1, with a porosity of about 80% and having a diameter of approximately 4 cm. and a thickness of 5 to 7 mm., weighed 5.6 grams after being cleaned thoroughly with nitric acid and washed and dried. It was then dipped into a tin solution consisting of 2.8 grams of stannous chloride, about 1 cc. of hot hydrochloric acid and 70 cc. of distilled water. After incompletely drying off the solution, the carrier was placed in a beaker whose inside bottom diameter was slightly in excess of 4 cm.

A silver solution was prepared by dissolving 3 grams of silver nitrate crystals in 3 cc. of distilled water and adding ammonium hydroxide drop by drop until the yellowish precipitate of silver hydroxide first formed had disappeared and the solution again became clear. This required approximately 3 cc. of the hydroxide solution (containing approximately 28% ammonium hydroxide).

The silver solution described was poured onto the carrier in the beaker. The beaker was then placed with its contents in a bell jar and the air was evacuated in order for the solution to be thoroughly impregnated into the innermost pores of the carrier. After removing the carrier thus impregnated, the excess silver solution including the drippings was set aside for further use. Then 2 cc. of formaldehyde (36%–38% solution) was deposited on the carrier, a drop at a time, every 15 seconds, in such a manner that the drops were distributed around to all parts of the surface, followed by the balance of the silver solution in the same manner. This was similarly followed by 1¼ cc. more of the formaldehyde.

Then 50 cc. of water was dripped through at the same rate for 30 minutes, followed by a drop every 5 seconds. Only the first 25 cc. of water carried away a significant amount of precipitate from the carrier which amounted to 0.35 gram.

The carrier was then placed in a furnace and the heat turned on. As the temperature increased, a stream of brown smoke was given off between about 212° C. to 265° C.

The resultant product weighed 6.7 grams or a net increase of 1.1 grams out of a theoretical 1.8 grams of silver in the original silver solution. A repetition of the process increased the weight of the plated carrier to 7.3 grams which was silver white in color both in the interior and exterior.

Thus, the result shows the possibility and advantages of using known silver plating ingredients in hitherto unknown and unused concentrations as the desirable basis of a new and useful application of a silver plating process to the interior surfaces of non-conductive porous electrode structures, so that the by-products of the plating process are advantageously disposed of by a novel heat treatment rather than by known washing or leaching processes, which often prove impractical.

*Example #5*

In accordance with another example of conductive silver plating a non-conductive porous electrode structure or carrier, such as a porous plastic carrier weighing approximately 2 grams and containing 8 cc. of voids, was thoroughly impregnated with 8 cc. of a commercially available liquid conductive silver coating material, containing 43% by weight of silver and mixed with about 3½ cc. of butylacetate (sp. gr. 0.9–1.0). The structure was then dried for ten to twelve hours, after which it was found to weigh approximately 2.5 grams. Thus, this structure was internally lined with a conductive silver coating weighing one-half gram and capable of being coated with nickel in the manner described in the following Example #6, or of being used directly as a carrier for electrode active materials, either positive or negative.

Obviously any volume of silver suspending liquid such as butylacetate, or its equivalent, which is compatible with that of the type of conductive liquid silver coating material used above, may be used to vary the concentrated weight of resultant silver coat layed down per cc. of pore space in any porous carrier.

The semi-conductive carriers and the conductive carriers may be readily silver plated in substantially the same manner by one or more of the silver plating examples set forth herein. However, in the case of plastic materials used in non-conductive or semi-conductive carriers, the heat treatment of Example #4 may be omitted when such materials would be injured by temperatures specified. In such instances, washing or leaching steps may be substituted to eliminate the by-products of this silvering process.

The porous silver-plated structure as described may be nickel plated by an improved process, in accordance with the present invention. It has been found that the usual known electroless processes of nickel plating require such dilute concentration of ingredients in the liquid plating solution that the flow of the solution through the pores of a carrier usually could not be accomplished at the rate of time required for the solution autogenously to give up its nickel content to the surface to be plated. This is particularly true in the later stages of the plating when the pores become smaller as more nickel is plated thereon. Thus, the flow through the carrier pores has to be governed very carefully, otherwise the plating may take place elsewhere than in the internal pores, or not at all. In accordance with the present invention, a process has been developed by which maximum concentration of ingredients in the plating solution is achieved, and thus, in effect, expediting the flow through the carrier of the nickel ingredients of the solution at the rate required to deposit the nickel content over the surfaces of the internal pores.

*Example #6*

In accordance with a specific example of this nickel plating process, a porous glass-bead carrier of the type described in Example #1, and with a silvering treatment described in Examples #4 and #5, was found to weigh 7.1 grams. This carrier was banded around its periphery with so-called mechanic's tape in such a way as to be flush with its bottom surface but to protrude about half an inch above its top surface. This tape formed a wall around the carrier in order to prevent the nickel plating solution to be hereinafter described, from overflowing the sides of the carrier.

The carrier was then placed in an appropriately shaped non-metallic funnel and sealed therein around the bottom periphery of the carrier in such a way as to prevent any liquid or air by-passing the carrier, thereby ensuring the channeling of the nickeling solution through the porous carrier rather than around it. A non-metallic tube was connected from the bottom of the funnel to a vacuum bottle to assist the flow of the solution through the porous carrier, especially during the later stages of the plating process when the pores in the carrier might have become too small to permit the necessary rate of flow of the solution by gravity alone.

The nickel plating solution not employing electric current from an outside source and of the required concentration used in this Example #6, may be prepared as follows:

Into 60 cc. of 28% ammonium hydroxide solution and 180 cc. of heated distilled water were successively dissolved 24 grams each of nickel chloride, sodium citrate, and ammonium chloride and 30 grams of sodium hypophosphite. Subsequently, 6 grams of sodium hydroxide were dissolved in 60 cc. of 28% ammonium hydroxide and 60 cc. of water, or alternatively 75 cc. of 28% ammonium hydroxide was mixed with 50 cc. of water. Either one of these alternative solutions could then slowly and carefully be poured into the salt solution described, without forming an undesirable precipitate such as a hydroxide or nickel metal particles.

The mixture was then allowed to drip onto the porous carrier at a 90° C. temperature, external heating of the carrier being preferable to preheating of the solution. This mixture was allowed to drop through at a rate such that the total quantity of solution could be passed through in about 2½ hours, or roughly at an average rate of 2.8–2.9 cc. per minute. Such rate might be greater at the start than at the finish, commensurate with the area of the internal pore surface plated. These pore areas diminished as the plating became thicker. It was found advantageous to change the side of the carrier on which the plating solution was dropped during the last half of the process and to control the flow of solution through the carrier in such a way that there would always be as nearly as possible a constant level of solution at or preferably slightly above the top surface of the carrier.

The resulting porous structure was found to be plated internally with 4.6 grams of nickel, its dry weight subsequent to this plating being 11.7 grams after thorough washing and drying. Such a quantity of plating nickel represents 80% of the nickel content of the solution dripped onto the porous carrier.

It was found that by means of the nickel plating process described in Example #6 that sometimes much more weight of nickel could be plated onto the inside surface of the porous structure than the weight of this structure, while maintaining adequate porosity of the carrier structure.

*Example #7*

For the purpose of this example, the following solution was prepared, i. e., 42.7 grams of nickel chloride (NiCl₂.6H₂O), 26.0 grams sodium chloride, dissolved in 100 cc. of water and sufficient hydrochloric acid added to lower the pH of solution preferably between 1.0 and 0.0. For applying this solution to a carrier capable of being electroplated with nickel, this solution was vacuum impregnated into the carrier and electrolytic action instituted opposite nickel anodes with this solution at about 1060 milliamperes. The result showed that at the end of the first hour the structure had observable clean plating. However, it was found that by changing some of the conditions such as decreasing the current density, and nickel-to-total-metal ion ratio in the solution, and lowering the temperature, the plating may further be caused to take place within the interior pores of the carrier.

The nickel plating processes are applicable to other porous carriers composed of other metals or especially of cheaper metal porous structures that could not otherwise be used for electrode purposes unless they were silver or nickel plated, such as iron porous electrode structures. Also, this improved nickel plating process may be used for plating directly onto the internal surface of certain non-metallic conducting porous structures, such as those made of graphite and carbon.

ADDITION OF ELECTRODE ACTIVE MATERIAL

With the carriers thus electrically conductively prepared for receiving the active battery material, the emplacement and embedding of this active material may be carried out by (a) sifting in and retention of the powder of the active material, and (b) by electro depositing the material.

For (a) sifting in the powder of the active material, any of the prepared carriers may be employed if prepared appropriately for the powdered material selected, and applied as follows:

*Example #8*

In accordance with this process, the active material in finely divided form and particularly in the form of dry powder is introduced into the porous electrode carrier by mechanically vibrating the same. For that purpose, the carrier is placed in a suitable vibrating mechanism and finely powdered active material such as oxides or hydroxides of nickel, cobalt, cadmium, lead, or iron, is sifted down into the internal pores of the carrier. This method is particularly advantageous for introducing cadmium, lead, or varying proportions of iron with cadmium, or their oxides or their hydroxides, into a porous electrode carrier because the subsequent "forming" operation of the electrode takes place with relatively high effectiveness compared to other active materials, and their resulting tendency to become spongy assists in their retention within the structure. It is also advantageous to introduce nickel or cobalt powder or mixture thereof into the porous structure by this means, especially if a subsequent nickel plating treatment is given to the powder filled structure in order to plate the nickel or other metal powder in place onto the internal surfaces of the porous structure.

In order to control the amount of powder remaining within the porous structure compared to what may sift through to the other side, particularly if such structure is thin, it has been found advantageous to set up a plurality of such porous structures in a pile on a vibrating mechanism, and to alternate their places within the pile in such a manner that each component unit of the pile shall receive an approximately equivalent weight of the powdered material to be retained. For the purpose of handling the carriers after receiving the powder, any suitable means may be employed to keep the powder temporarily in place, such as by watering or by using an adhesive tape.

When nickel powder is used, it is desirably made from nickel carbonyl and the particles are substantially spherical and not irregular such as those of nickel hydroxide. These nickel particles therefore will shake very easily into the porous carriers of the electrode. After the powder is sifted into the carrier it may be nickel plated into place. The nickel plating as well as the powder is then rendered active either by heating in an atmosphere of oxygen or electrolytically as described as follows:

Example #9

In accordance with one aspect of the present invention, the porous nickel electrode structure described, or a nickel plated electrode of the general type which has been described, is anodically activated by placing the electrode in a solution of sodium hydroxide and sodium chloride as an anode in conjunction with an appropriate cathode such as graphite and passing current between the electrodes through the solution.

In this specific example of producing a porous nickel electrode or a nickel plated electrode, 10 grams of sodium hydroxide and 14.5 grams of sodium chloride were dissolved in enough water to make 500 cc. of solution. Into this solution was placed a cathode, and as an anode a porous nickel-plated or porous sintered nickel electrode made for example, as described in Examples #1 and #2. When a suitable current was turned on, green nickel hydroxide was formed inside the anode which filled with pores and exuded therefrom. It was found that by doubling the quantity of sodium hydroxide in the solution, it was possible to produce the more oxidized black nickel hydroxide in the same manner as the green oxide. An anode so produced is capable of being set up in a cell of a storage battery with a suitable cathode ready for the usual subsequent forming or initial charging or "cycling" operation.

Where cadmium or lead powder is introduced into the pores of the porous electrode carrier, this powder will adhere to the internal surfaces of the porous carrier without the necessity of plating the cadmium or lead powder into place by the simple expedient of using the cell in which the cadmium or lead electrode is incorporated at least through one cycle of charging and discharging. This cycling results in having the cadmium or lead become more spongy in form.

Further, in accordance with this invention, the active material, of whatever nature, can be placed in the plated carrier to complete the assembly of the battery electrode by suitable electrolytic means. Above, there has been disclosed that nickel plating had been applied internally to the carrier, and that the above process was continued without interruption, and that active electrode material was formed in the internal pores of the porous carrier.

In another process of cathodically plating electrolytically the internal pores of the carrier with nickel, cobalt, cadmium, or iron, or their combinations, and sometimes silver, to deposit active electrode material, results may be accomplished by employing a preferred electrolytic process. It is to be noted below that one of the completed electrodes when mechanically broken open, has a bright nickel coating on the exterior thereof and that within the pores there is a plating of black, brown or green color showing that the active material is carried in the pores of the electrode. The process of accomplishing the emplacement or embedment of this active material as shown by the broken electrode just mentioned, is as follows:

Example #10

In regard to a preferred electroplating solution for this example, there is the creation and operational control of such an electroplating solution with sufficient "throwing-power" whereby deposition of metals or their compounds may be made to occur continuously within the internal pores of a porous carrier structure in preference to, or to the exclusion of, the external surfaces of such a carrier structure.

This may be achieved, when selecting nickel oxide or hydroxide as the electrode active material, by a variety or multiplicity of compromises in the factors which theoretically effect "throwing-power" in the creation and operational control of these plating solutions. The term "throwing-power" is noted in the third edition of Principles of Electroplating and Electroforming by Blum & Hogaboom (McGraw-Hill), page 89, when relating to plating solution, as a qualitative measure of the ability of the solution to deposit metal over the entire surface of an article, and has been used principally as a measure of distribution of the deposits, i. e., of the relative thickness on different parts of an article.

For instance, in accordance with present theory, a highly concentrated, preferably saturated, viscous, solution is desirable with maximum metal ion content but a relatively low proportion of nickel ions. The non-nickel metal ions should preferably consist of one or more of the group lithium, sodium, ammonium, or potassium. Lithium, possibly in the form of hydrate, may be adsorbed by the nickel oxide or hydroxide as it is plated into position and thereby subsequently benefit the electrical capacity of the finished electrode. Sodium, in the form of sodium chloride, is cheap and adequate. Ammonium and potassium in the form of their chlorides are advantageous because of their quality of imparting a relatively low internal resistance to electrolytes. A low internal resistance is, in turn, advantageous in increasing the "throwing-power." One of the important functions of the above mentioned non-nickel metal ions is to assist in creating, as the result of electroplating, a strong alkalinity to that part of the solution within the pores of the carrier where electro-deposition occurs. This alkaline portion of the solution diffuses relatively slowly from the interior of a porous type of electrode structure, and hence, in the presence of oxidants in the solution, results in the nickel of the solution which is being deposited out by the process, being plated in oxide or hydroxide form onto the surfaces of the interior pores of the electrode. Obviously any other appropriate non-nickel ion could be used or substituted in this process for those mentioned above, which would assist in this function and which would not be deleterious to the subsequent use of the electrode in a battery. Appropriate other anions than chlorine particularly some of those known to the art of nickel plating, could obviously be used or substituted in the solution and still come within the purview of the basic and hitherto undisclosed points of this invention. This is also the case of oxidizing anions such as nitrates or the like, which might be substituted in part or in whole for the oxidants mentioned above in the examples.

Among other factors that contribute to the success of this plating is temperature control. It has been found that room temperature or preferably below room temperature (but above the freezing point of the solution) slows down diffusion and aids throwing-power of the solution.

Of considerable importance to the plating process herein described in the current density employed in the electrolysis. Operating at a relatively high current density (particularly with a very acid solution) tends to prevent the alkaline portion of the solution from diffusing away from the interior of the carrier. This tends to keep the exterior silver or nickel plated surfaces of the carrier clean and free from the formation of oxides or hydroxides. This also tends to deposit material less evenly in the interior pores with relatively more material piled up nearer to the outer surface than to the center. While this is advantageous in the early stages of the process, because it slows down subsequent diffusing out of the alkaline portion of the solution, such slowing down of diffusion in the electrode adversely affects its function in a battery. Conversely, a relatively low current density fails to keep the exterior nickel surfaces as clean and free from oxides or hydroxides as a high current density, and also slows down the rate at which active material may actually be added to the interior of the carrier structure per ampere-hour of plating time. However, a relatively low current density very greatly increases the subsequent usability of the active material in a functioning battery electrode.

The following factors are considered and varied as desired to obtain following optimum results: degree of acidity, current density, voltage range, solution content and concentration, total plating time, physical characteristics and dimensions of the carrier, temperature of plating bath, spacing of anodes with respect to cathodes, and other minor factors.

While the foregoing has been described in using nickel in the solution, it is to be understood that cadmium, cobalt, lead or their combinations, or other metal ingredients of battery active material may be employed.

In creating and using and controlling an electrode plating solution that exerts sufficient throwing-power to deposit the metals or their compounds or oxides or hydroxides, it was found that they act within the internal pores of the porous structure in preference to being deposited on the external surfaces of such a porous structure. Also, it was found that the depositing process is carried on continuously and without interruption.

The foregoing manner of the depositing of the active material in the carrier and the functioning of the electrolytic solution proceed under a theory as now understood to provide a battery electrode which is a most satisfactory electrode within the disclosures of this invention.

The following two examples are variations of Example #10 and give desirable proportions of the composition of the electrolytic solution.

*Example #11*

This example illustrates the effectiveness of plating at a very low current density to obtain a battery electrode of high electrical capacity per cubic centimeter of pore volume.

35.6 grams of nickel chloride ($NiCl_2.6H_2O$) were dissolved in 25 cc. $H_2O$ and 320 cc. of sodium hypochlorite solution (5¼%) and 8 cc. of hydrochloric acid (37%) and thoroughly stirred. A 10.2 gram porous graphite structure, approximately 63.5 mm. in diameter with a calculated effective porosity of 4.7 cc. with an average pore diameter of around .0075 inch, was set up as a cathode opposite a suitable anode in the above solution. Electrolysis was allowed to take place at an average current rate of about 52 milliamperes without any added ingredients for a total of 3½ ampere hours. After washing, and heating with a light heat sufficient to drive off all the moisture, and brushing off the exterior surfaces, the net electrode weight was found to have increased 5.8 grams. The electrode was then set up as the anode of a battery cell opposite cadmium cathodes and "formed." Upon discharge at 100 milliamperes, it was found the current lasted over 10 hours down to a voltage of 1 volt, thus indicating 1 ampere hour capacity for this advantageously simple cell.

It is understood that nickel oxide colloids may be formed in the above solution and that such colloids usually contribute to the rate of the above mentioned plating.

*Example #12*

This example presents the obtaining of a battery electrode of similar electrical capacity but which was plated at a relatively high pH.

A plating solution was made up as follows: 150 grams of sodium chlorate and 85.4 grams of nickel chloride were dissolved in 200 cc. of water, and 1 cc. of perchloric acid (70%–72%) added. A 10.0 gram porous graphite structure similar to that used in Example #11 was vacuum impregnated with the solution. An electrolysis was instituted opposite nickel anodes with this solution at about 1060 milliamperes. Perchloric acid was added at the rate of approximately 2¼ cc. per hour for 8 hours and which rate was reduced down to 1¾ cc. per hour for the next eight hours. The pH during most of the process did not exceed 4.5–5.0. The internal pores of the electrode were then found to have added a calculated weight of 8 grams of nickel hydroxide by this simple and novel plating process.

In another experiment similarly carried out but with a plating time of 18½ hours instead of 16 hours, a calculated amount of 8.1 grams of nickel oxide or hydroxide was added to the internal pores of the carrier. This electrode, when charged and discharged in a battery was found to have the extraordinarily high capacity of 1.35 ampere hours, or about .3 ampere hour per cubic centimeter of effective porosity.

In producing a battery electrode with the pores having a very large deposit of active material therein, even up to 40% or 50%, but still not closing the pores, Example #13 given below provides the detailed disclosure for such a complete electrode and includes details of preliminary nickel plating. The battery may employ any one of the above carriers that has been nickel plated, or it may be a conductor carrier, or it may be a porous graphite carrier.

*Example #13*

The preparation of the carrier used for this example included the nickel coating steps noted in Example #7 above wherein there was continuous depositing of nickel on the carrier. However, while the current was still being continued, oxidants were added to cause the process to deposit nickel oxides or nickel hydroxides, on the surfaces of the internal pores of the carrier.

The preferred physical characteristics of this employed carrier are as follows: 5 gram weight of porous graphite wafer, about 45 mm. in diameter, and approximately 3 mm. thick; the average effective porosity was rated by manufacturer as about 48% with an average pore diameter of 190 microns and the rated weight averaged 1090 grams per cu. cm. Thus, the volume of internal voids, or pore space, was calculated to be approximately 2.3 cu. cm.

The plating solution used for this example was as follows: 34 grams of sodium chloride were dissolved in 100 cc. of distilled water, followed by 22.8 grams of $NiCl_2$—$6H_2O$ and 1 cc. of hydrochloric acid (35–37%). The porous electrode was immersed in the solution and preferably placed in a bell jar connected with a vacuum pump and the air evacuated in order to facilitate the penetration of the solution into the innermost pores of the electrode.

The graphite carrier was set up as the cathode in the solution opposite nickel anodes, and a current applied to the circuit of 1040 milliamperes. It was preferably found desirable to cool the electrolyte by means of an exterior ice-water bath in order to make the solution more viscous. The electrolysis was continued for half an hour during which time another ½ cc. of hydrochloric acid (35–37%) was added. At the end of this period, a nickel plating on the surface of the wafer could be observed. Thus, a theoretical amount of roughly ½ a gram of nickel had been plated onto the wafer for the purpose of increasing its conductivity and for controlling the size of the outside pores, and mechanically strengthening the electrode structure. At this point, oxidizing agents were added to the solution, namely, 9 grams of sodium chlorate, and 2¼–2½ cc. per hour of perchloric acid (70–72%). Observed voltage was .95 volt but this voltage built up to about 1.20 volts at the end of the first hour at which time the perchloric acid addition was discontinued, and hydrochloric acid (35–37%) substituted at the rate of 3 cc. per ampere hour of plating so as to maintain a pH of approximately zero. Voltage was watched carefully and was found to rise rapidly once it had reached 1.35 volts, at which point the current was reduced from 1040 milliamperes to 750 milliamperes. It was found that if the voltage rose above 1.35 volts, then nickel hydroxide would form rapidly on the outside of the electrode, whereas operating below this voltage by means of suitable current control, the outside nickel plated surfaces remained clean.

In this example, the hydroxide plating portion of the process was arbitrarily terminated after 5.7 ampere hours. The electrode was washed out in hot water to remove all soluble salts such as sodium chloride. After a complete drying out of the porous carrier, it was found to have increased 4.0 grams in weight, of which only about 0.5 gram was theoretically nickel. The rest consisted of green nickel hydroxide. Thus, it is calculated the combined volume approximated 40% of the effective porosity of the electrode. However, upon charging and discharging in a battery, the resultant electrical capacity amounted to only 0.3 ampere hours. While this is considerably below the theoretical capacity, it is to be noted that the pores were still open to diffusion.

*Example #14*

In this example a 5 gram circular wafer or carrier of porous graphite similar to that described in Example #13, was used in this example, having an effective calculated porosity of 2.3 cubic centimeters, and a thickness of approximately 3 mm.

Using the same formula and process conditions as in Example #13, the exterior initial plating of the carrier was conducted for 45 minutes instead of 30, and the subsequent nickel hydroxide plating conditions were changed only in respect to the current flow. Thus, for the first hour only a current of approximately 1070 milliamperes was used, which was reduced and maintained at 250 milliamperes for the next 4 ampere hours of plating. The electrode was then removed from the solution, and found to weigh only .6 gram less (saturated with solution) than that of Example #13 similarly weighed.

Without drying out the solution, the carrier was subjected to several hours of washing in running water, followed by 18 hours of charging in potassium hydroxide solution of approximately 1.14 specific gravity opposite cadmium electrodes at approximately 100 milliamperes. The cell was discharged continuously (except for "no-load" readings) at the same rate, with the following results;

| Time | Voltage Reading with 100 milliampere load |
| --- | --- |
| 1 hr | 1.25 |
| 2 hr | 1.23 |
| 3 hr | 1.21½ |
| 4 hr | 1.19½ |
| 4½ hr | 1.18 |
| 4¾ hr | 1.14 |

From the above reading, it may be calculated that this positive electrode had over .2 ampere hours of capacity per cu. cm. of effective initial pore space within the porous electrode structure. Furthermore, the discharge was made at better than the so-called "5 hour rate" which is an accepted standard rate of discharge in the industry.

From the last two examples, it will be noted there is a dual function of the same electrolyte solution in that it nickel plates the prepared carrier, and as further operated, continuously places the active material in the carrier.

In the foregoing, it is noted that the use of nickel is often set forth, and it is to be understood that cobalt may be substituted in whole or in part for the use of nickel in practically all of those instances, even if it is necessary to adjust some of the applicable conditions of the processes described herein.

Based on the many examples presented above, it will be particularly noted that a battery electrode has been produced which is porous and which carries the active battery material in a manner that gives optimum performance of the battery.

It will be noted also that it is possible and desirable in making the active electrode of light weight, to prepare its carrier of a non-conducting material such as glass beads, or other plastics or ceramics. Also, it is to be noted that when making the carrier of glass beads or plastics, that such a carrier is also usable as a filter element, and any of the porous carriers disclosed herein that do not give way under filter use, may be readily employed in the filtering industry.

In this invention by using the improved and preferred positive and negative electrodes in a battery of the nickel-cadmium or nickel iron alkaline type, it is possible to combine the advantages of a very much lower cost and lighter weight with high charge and discharge rates, high capacity, high repetitive cycling capacity, and excellent serviceability after many years of use or non-use.

It will be understood that various modifications and changes may be made in the preferred form of the invention herein, and such modifications and changes are to be understood as part of this invention, as outlined in the following claims;

The invention claimed is:

1. A method of producing an electrode for a battery comprising, sifting active electrode material in finely divided form into the pores of a mechanically rigid porous electrode carrier, and electrolytically fixing said active material in place in said carrier.

2. A method of producing a cadmium electrode for a battery comprising, sifting cadmium powder into the pores of a mechanically rigid porous electrode carrier, and electrolytically fixing said powder in place in said carrier.

3. A method of producing a iron electrode for a battery comprising, sifting iron powder into the pores of a mechanically rigid porous electrode carrier, and electrolytically fixing said powder in place in said carrier.

4. A method of producing a cadmium and iron electrode for a battery comprising, sifting cadmium and iron powder into the pores of a mechanically rigid porous electrode carrier, and electrolytically fixing said powder in place in said carrier.

5. A method of producing an electrode for a battery comprising, setting up a pile of mechanically rigid porous electrode carriers, vibrating said carriers, introducing electrode active material in finely divided form into the pores of said carriers by sifting said material downwardly from the top carrier successively through said carriers, and electrolytically affixing the powder in place.

6. A method of producing an electrode for a battery comprising, setting up a pile of mechanically rigid porous electrode carriers, vibrating said carriers, introducing electrode active material in finely divided form into the pores of said carriers by sifting said material downwardly from the top carrier successively through said carriers, interchanging the position of said carriers between sifting operations, and electrolytically affixing the powder in place.

7. A method of producing an electrode for a battery comprising, sifting metal powder into the pores of a mechanically rigid porous electrode carrier, and plating said powder within said pores of said carrier to fix said powder in place prior to treating said plating and said powder to render them active.

8. A method of producing an electrode for a battery comprising, sifting nickel powder into the pores of a mechanically rigid porous electrode carrier, plating said powder with nickel to fix said powder in place, and treating said plating and said powder to render them active.

9. An electrode for a battery comprising, a mechanically rigid porous electrode carrier, powdered electrode material in the pores of said structure, and a plating of said electrode material for holding said powdered material in position prior to treating said plating and said powder to render them active.

10. An electrode for a battery comprising, a mechanically rigid porous electrode carrier, and powdered nickel mechanically introduced into the pores and electrolytically affixed in the pores of said structure.

11. A carrier for a battery electrode comprising, a mechanically rigid electrically conductive porous structure having powdered nickel in the pores thereof, and nickel plating fixing said powdered nickel in place prior to treating said powdered nickel and said nickel plating to render them active.

12. An electrode for a battery comprising, a mechanically rigid porous electrode carrier, and powdered cadmium electrolytically affixed in the pores of said structure.

13. A method of making an electrode for a battery comprising, silver plating the internal surfaces of a mechanically rigid porous electrode carrier, partially filling the pores of said plated carrier with active electrode material in finely divided form, and plating said electrode material in said pores with similar electrode material and still maintain a porous condition.

14. An electrode for a battery comprising, a non-metallic mechanically rigid porous electrode carrier having a relatively thin silver plating over the internal surfaces of its pores, and battery electrode active material embedded in said pores and against said silver plating.

15. An electrode for a battery comprising, a non-metallic mechanically rigid porous electrode carrier having a relatively thin silver plating over the internal surfaces of its pores, and battery electrode active material in plated form on the surfaces of the silver plated pores of said carrier.

16. In the method of providing an active battery electrode, the steps of providing a non-metallic mechanically rigid porous carrier, metal plating the surfaces of the pores of said carrier to give a thin electrical conductive plating, immersing said plated carrier in an electroplating solution having sufficient throwing power to deposit battery active material continuously upon the surface areas of the internal pores of said porous structure.

17. In the method of providing an active battery electrode, the steps of providing a non-metallic mechanically rigid porous carrier, plating said carrier with a thin metal conductive coating over the exterior and throughout the pores of said carrier, and sifting into said pores loose lead powder, and electrolytically embedding said powder in said pores.

18. In the method of providing an active battery electrode, the steps of providing a non-metallic mechanically rigid porous carrier, sifting loose lead powder into the pores of said carrier, and mechanically embedding said powder in said pores.

19. A positive battery electrode comprising a non-metallic, porous carbon carrier, a thin nickel lining having been continuously deposited over substantially all of the internal surfaces of the pores of said carrier, and nickel hydroxide plated on to the said lined surfaces as battery active material.

20. An electrode for a battery, comprising a non-metallic, mechanically rigid, porous electrode carrier, having a relatively thin nickel lining having been continuously deposited over the internal surfaces of its pores, and battery electrode active material in plated form on the surfaces of the nickel lined pores of said carrier.

References Cited in the file of this patent

UNITED STATES PATENTS

| | | |
|---|---|---|
| 228,389 | Powell | June 1, 1880 |
| 655,920 | Burke | Aug. 14, 1900 |
| 665,915 | Kugel | Jan. 15, 1901 |
| 793,078 | Hubbell | June 27, 1905 |
| 857,929 | Edison | June 25, 1907 |
| 897,833 | Hubbell | Sept. 1, 1908 |
| 931,081 | Perry | Aug. 17, 1909 |
| 977,984 | Tone | Dec. 6, 1910 |
| 1,019,463 | Hansen | Mar. 5, 1912 |
| 1,149,974 | Chisholm | Aug. 10, 1915 |
| 1,509,138 | Grafenberg | Sept. 23, 1924 |
| 1,642,348 | Williams et al. | Sept. 13, 1927 |
| 1,649,579 | Edison | Nov. 15, 1927 |
| 2,197,562 | Reinker | Apr. 16, 1940 |
| 2,255,236 | Willis | Sept. 9, 1941 |
| 2,306,310 | Haux | Dec. 22, 1942 |
| 2,361,378 | Brennan | Oct. 31, 1944 |
| 2,370,242 | Hensel et al. | Feb. 27, 1945 |
| 2,386,544 | Crowley | Oct. 9, 1945 |
| 2,392,263 | Records | Jan. 1, 1946 |
| 2,392,568 | Bair | Jan. 8, 1946 |
| 2,401,582 | Owen | June 4, 1946 |
| 2,406,172 | Smithells | Aug. 20, 1946 |
| 2,409,295 | Marvin et al. | Oct. 15, 1946 |
| 2,474,502 | Suchy | June 28, 1949 |
| 2,532,283 | Brenner et al. | Dec. 5, 1950 |
| 2,561,943 | Moulton | July 24, 1951 |
| 2,610,220 | Brennan | Sept. 9, 1952 |
| 2,616,165 | Brennan | Nov. 4, 1952 |
| 2,626,294 | Brennan | Jan. 20, 1953 |

FOREIGN PATENTS

| | | |
|---|---|---|
| 653,235 | Great Britain | May 9, 1951 |
| 976,479 | France | Oct. 25, 1950 |
| 21,004 | Great Britain | July 22, 1909 |